United States Patent [19]

Hass et al.

[11] 4,398,063

[45] Aug. 9, 1983

[54] MOBILE TELEPHONE INTEROFFICE HANDOFF LIMITING METHOD AND APPARATUS

[76] Inventors: Ronald J. Hass, 2S 513 Cree Ct., Wheaton, Ill. 60187; Charles F. Hunnicutt, 35W 785 Park La., Saint Charles, Ill. 60174

[21] Appl. No.: 200,415

[22] Filed: Oct. 24, 1980

[51] Int. Cl.³ .......................... H04B 7/15; H04B 7/04
[52] U.S. Cl. ................................................ 179/2 EB
[58] Field of Search .............. 179/2 EB, 2 E; 455/33; 5/451

[56] References Cited

U.S. PATENT DOCUMENTS

| | | | |
|---|---|---|---|
| 2,896,072 | 7/1959 | Bachelet et al. | 325/53 |
| 4,187,398 | 2/1980 | Stark | 179/2 EB |
| 4,228,319 | 10/1980 | De Jager et al. | 179/2 EB |
| 4,233,473 | 11/1980 | Frost | 179/2 EB |
| 4,284,848 | 8/1981 | Frost | 179/2 EB |

OTHER PUBLICATIONS

"High-Capacity Mobile Telephone System Technical Report", Bell Laboratories, Dec. 1971, pp. 1-1 thru 1-4, 3-6 thru 3-10, and 3-48 thru 3-52.
"High Capacity Automobile Telephone System-Part I System Outline", by H. Kubota et al., *Japan Telecommunications Review*, vol. 21, No. 1, Jan. 1979, pp. 44-53.

*Primary Examiner*—Thomas W. Brown

[57] ABSTRACT

Trunks (16-18) included among mobile telecommunication switching offices (MTSO$_1$-MTSO$_3$) serving different mobile service areas (MSA1-MSA3), respectively, and included in a single call connection, are switched to drop from the connection any MTSO beyond a new handoff target MTSO that was already in the connection as a tandem MTSO.

9 Claims, 12 Drawing Figures

MOBILE TELEPHONE INTEROFFICE HANDOFF LIMITING METHOD AND APPARATUS

This invention relates to mobile radiotelephone communication systems, and it involves, in particular, a method and apparatus for limiting the extent of trunk-interconnected switching offices in any given call connection.

BACKGROUND OF THE INVENTION

Cellular mobile radiotelephone systems contemplate telecommunication channel reuse pattern iteration to enable the coverage of an extensive geographical area for including and linking together plural large metropolitan areas with a single continuous pattern iteration. One system for an urban area, and characterized as the "advanced mobile phone service," is described in Vol. 58, No. 1, of the *Bell System Technical Journal* (BSTJ) issue of January, 1979.

Switching technology and the economics of circuit length impose limitations on the number of cell antenna sites and the extent of a geographical area which may be covered in a single mobile service area (MSA) controlled from a single mobile telecommunication switching office (MTSO). Just as mobile radiotelephone units pass from cell to cell in a single MSA, there will be times when mobile units will need to pass from MSA to MSA during the course of a single call in progress. A similar situation has been encountered in route-based systems extending along a railway or a highway route. One such system is shown in the U.S. Pat. No. 2,896,072 to A. E. Bachelet et al. In the Bachelet patent, trunks are included between control points connected to different central offices and are utilized in response to teletypewriter circuit signals between control circuits to enable an operator to transfer a call from one area to another by way of extended trunks. However, operator invtervention is required, and there is little or no occasion in a route-based sytem for a mobile unit to pass through a given mobile service area more than once during the course of a single call.

In "High-Capacity Mobile Telephone System Technical Report," filed Dec. 20, 1971, with the Federal Communication Commission under docket 18262, the movement of mobile units among different areas is considered. In land systems, movement among metropolitan coverage areas is mentioned at pages 1-2 through 1-4, and 3-6 through 3-10; and in air systems, movement among regions controlled by different switching offices is mentioned at pages 3-48 through 3-52. It was there considered that no call handoff would be required between metropolitan coverage areas of a land system but that mobile switching offices within one such area could be interconnected on call origination. For an air-ground system, it was considered tht up to one handoff of a call between air mobile switching offices could be accomplished under the control of an air data center.

In none of the prior art was consideration directed to the possibility of excessive interoffice trunk accumulation in a single call connection because of either topography in a boundary region between service areas or a particular route followed by a mobile unit in such a region. This type of accumulation leads to reduced received signal quality and inefficient utilization of interoffice trunk resources.

SUMMARY OF THE INVENTION

The burden of the foregoing problems with the prior art handoff arrangements is significantly reduced by causing the MTSO controlling the cell antenna site serving a mobile unit engaged in a call to be also the controlling server for interoffice trunks tandem connected to that server in the call connection. Thus, each MTSO is an essentially autonomous unit as to calls for which it serves one mobile unit party, but is operates as a controlled tandem (trunk-to-trunk) unit for such calls after it has established an extended trunk connection to a new serving MTSO for the call.

When a serving MTSO has identified a new target MTSO for an inter-MSA handoff, the serving MTSO checks to determine whether or not the target MTSO is already a tandem MTSO in the connection for the call to be handed off. If the target MTSO is already a tandem MTSO in the call connection, the serving MTSO initiates a drop-back. That is, it causes all inter-MTSO trunks in the call connection between that tandem MTSO location and the serving MTSO location to be disconnected at substantially the same time that the target/tandem MTSO re-assumes the role of serving MTSO for the call. In this way, the mobile unit user is not inconvenienced, trunks actually used in a call connection are held to a low number even though a mobile unit may cross MSA nominal borders several times, and landline costs for control purposes are held to a low level.

BRIEF DESCRIPTION OF THE DRAWING

A more complete understanding of the invention and the various features, objects, and advantages thereof may be obtained from a consideration of the following Detailed Description in connection with the appended claims and the attached drawings in which

DETAILED DESCRIPTION

Figure 1:
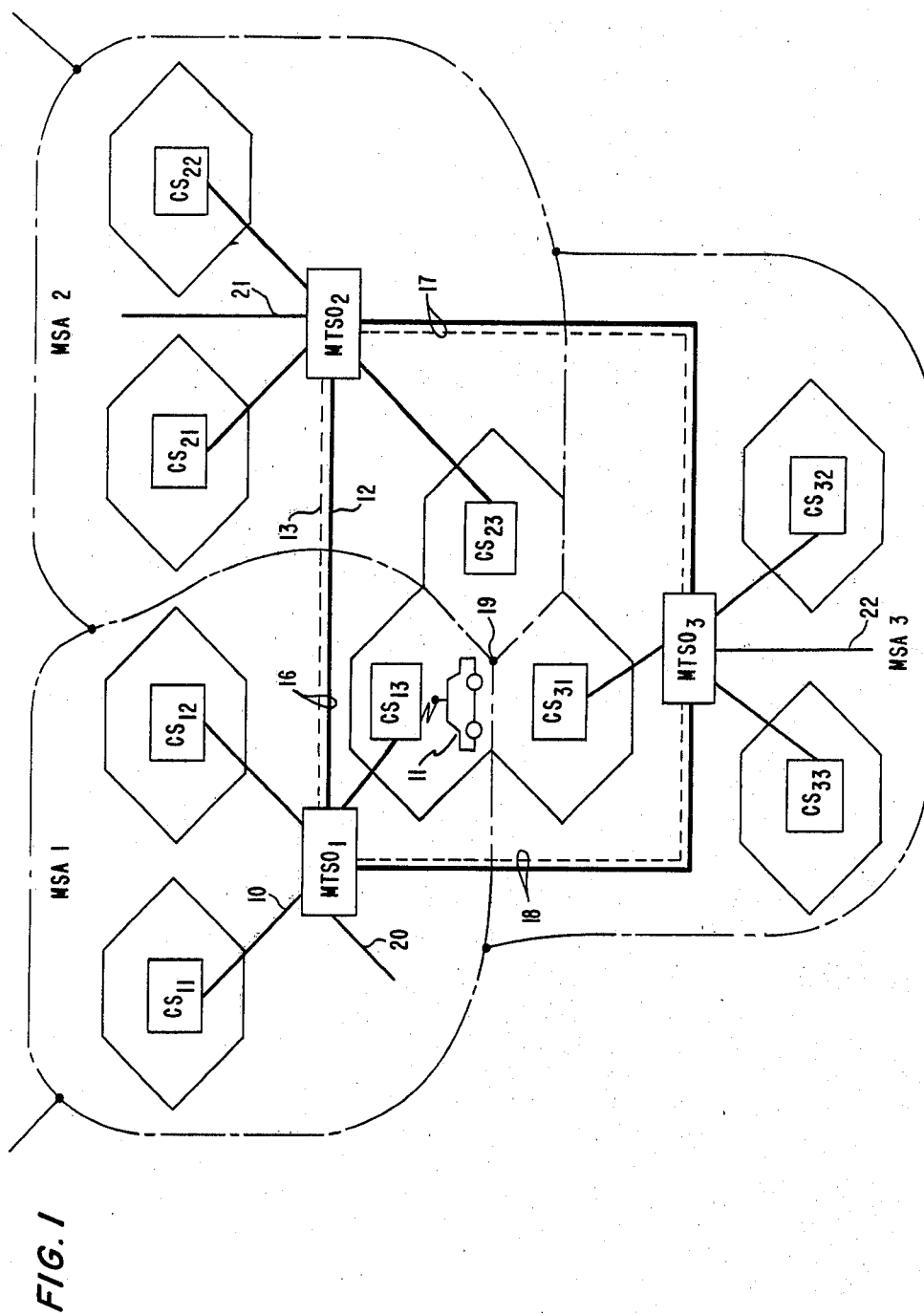
FIG. 1 is a simplified diagram of a part of a land mobile radiotelephone network for illustrating the present invention.

In the FIG. 1 network diagram, there are shown three adjacent mobile service areas MSA1-MSA3 of a cellular high-capacity mobile radiotelephone network. Alpha-numerical reference characters are employed in the drawings and, in particular in FIG. 1, in order to facilitate reader association of different functions to be described with the various areas and regions in which mobile units may travel during operation in accordance with the present invention. Each MSA in FIG. 1 is advantageously of the type generally described in two papers in the aforementioned issue of the BSTJ. These are "Advanced Mobile Phone Service: Introduction, Background, and Objectives," by W. R. Young at pp. 1-14, and "Advanced Mobile Phone Service: The Cellular Concept," by V. H. Mac Donald at pp. 15-41.

Briefly, however, each area includes an MTSO controlling operations in a plurality of cells in the MSA. Each cell is, for convenience of description, considered to have nominal hexagonal boundaries; and the entire MSA is covered by a network of adjacent ones of such cells. At least one cell site, such as the cell site $CS_{11}$, is provided in each cell and is the site of antennas of either the directional or omnidirectional type for providing radio communication with mobile units travelling in the cell served by the cell site. Each cell site is coupled to the MTSO of its MSA by a plurality of dedicated voice trunks on the basis of one such trunk per voice channel radio which is equipped at the cell site. In addition, a duplex data communication path is provided between the cell site and the MTSO for the transmission of data messages to effect the necessary cooperation between the cell site equipment and the MTSO. All of those voice trunks and the associated duplex data communication path are for each cell site schematically represented in FIG. 1 by a single line such as, e.g., the line 10 extending between cell site $CS_{11}$ and the $MTSO_1$. Although many mobile radio units are advantageously served in each MSA and in each cell of an MSA, for convenience of illustration, only a single mobile unit, represented by the automobile 11 in the cell served by cell site $CS_{13}$, is shown in FIG. 1.

Each MTSO in FIG. 1 is interconnected with the MTSO's of all adjacent MSA's by way of plural voice trunks, such as those schemetically represented by a broad line 12 between $MTSO_1$ and $MTSO_2$ in FIG. 1, and at least one duplex data transmission path, such as that schematically represented by the dashed line 13 in FIG. 1 between $MTSO_1$ and $MTSO_2$. That combination of voice trunks and data paths between $MTSO_1$ and $MTSO_2$ is further designated as the trunk path 16, and similar trunk path arrangements are provided in the form of a trunk path 17 between $MTSO_2$ and $MTSO_3$, and a trunk path 18 between $MTSO_3$ and $MTSO_1$. The three illustrated MSA's are of arbitrary configuration as indicated by the broken-line nominal boundary lines surrounding each of the areas. A node is indicated where boundry lines intersect; and, in particular, a node 19 represents the intersection of boundaries of the three illustrated MSA's, MSA1-MSA3, and is common to boundaries of all three of such areas.

Each MTSO exercises autonomous control of the cell site equipment in its own MSA for setting up, maintaining, and taking down communication paths for mobile radiotelephone units locted in the MSA. In order to facilitate communication between those mobile units and a fixed station telephone subscriber in the public switched telephone network, each MTSO includes at least one trunk facility such as the trunks 20-22 for the offices $MTSO_1$-$MTSO_3$, respectively, in FIG. 1, and extending to respective local class 5 telephone offices (not shown). It is to be noted, however, that in the network of FIG. 1, there is no higher level supervisory office for overseeing and coordinating the operations of the various MTSO's.

When the mobile unit 11 moves among the cells of MSA1, the serving $MTSO_1$ for that area controls the handoff of any call in progress in an autonomous manner so that the radio frequency channel used by the mobile unit for a call in progress is changed as may be necessary. The fixed wire connections between MTSO and serving cell site are also changed as necessary to maintain the call in progress without significant awareness of the parties to the call, all as described in the aforementioned issue of the BSTJ. When the mobile unit 11 moves from MSA1 to MSA2, i.e., from the cell served by cell site $CS_{13}$ to the adjacent cell served by the cell site $CS_{23}$, the serving $MTSO_1$ autonomously arranges for a new handoff target MTSO, such as the $MTSO_2$, in the new MSA to become the serving MTSO and arranges for extension of a voice trunk in the path 16 to be extended thereto for maintaining the call without disturbing either party to the call. If the serving $MTSO_1$ is to remain in the ongoing call connection, it then becomes merely a tandem office for that call; and the target $MTSO_2$ becomes the new serving MTSO. However, if the target MTSO is already a tandem MTSO in the connection, the old serving $MTSO_1$ arranges for the disconnection of any trunk circuits which are not necessary to the continuation of the call connection under the control of the new serving $MTSO_2$. The manner of operation of a serving MTSO in the autonomous fashion just outlined will be hereinafter described in greater detail. First, however, the internal arrangement of an MTSO will be briefly described in order to facilitate a better perception of the autonomous MTSO operating process to be described later.

Figure 2:
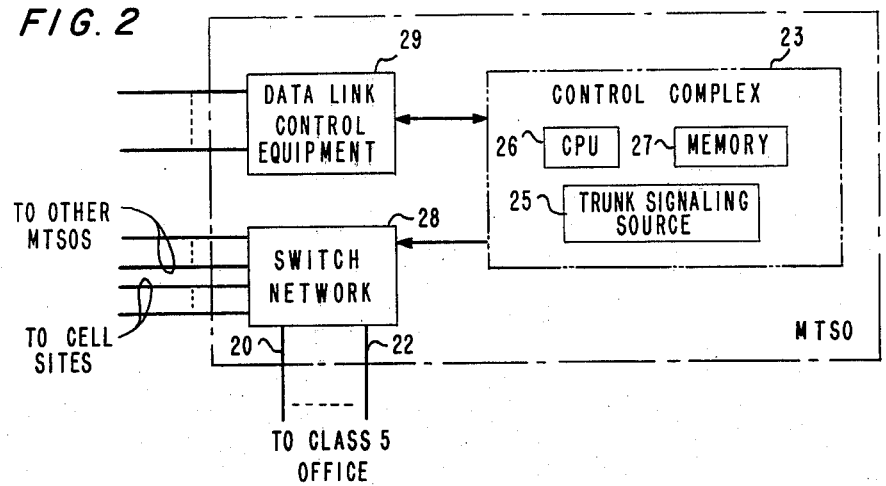
FIG. 2 is a block diagram of an MTSO which is useful in implementing the present invention.

An MTSO is shown and described in the aforementioned BSTJ issue in a paper entitled "Advanced Mobile Phone Service: Mobile Telephone Switching Office," by K. J. S. Chadha et al. at pp. 71-95. FIG. 2 herein is a block diagram of an MTSO in accordance with the description in that paper and further modified to correspond to the network diagram of FIG. 1 herein. A control complex 23 includes a trunk signaling source 25, a central processing unit (CPU) 26, and an associated memory 27, which cooperate to execute stored programs for controlling cell sites, mobile units served thereby, and a switch network 28. Source 25 includes within its schematic representation the trunk circuits associated with respective trunks coupled to network 28. Network 28 implements the voice path switching required among the local class 5 office to which the MTSO is coupled, voice trunks to cell sites controlled by the MTSO, and the voice trunks to other MTSO's in adjacent MSA's. In executing these programs, the control complex utilizes either or both of known voice trunk signaling techniques and bidirectional data communication on the hereinbefore described data paths associated with the various trunks and implemented by data link control equipment 29. The manner of MTSO call processing with respect to its controlled cell sites and its accociated class 5 office has been hereinbefore outlined and is further described and illustrated at pp. 77-83 of the aforementioned Chadha et al. paper. The manner of call processing with respect to MTSO's in adjacent MSA's will now be described.

When one considers interoffice handoff, it is known, as already described for an air mobile system, that the number of successful handoffs of a single call in progress may be limited in order to maintain signal quality within bounds of a system loss level plan. Such a limitation is particularly useful in so-called land-based mobile radiotelephone systems wherein circuits between MTSO's and between an MTSO and each of its cell sites are likely to be local exchange-type trunks, of widely variable length. In addition, the quality of such trunks is also likely to vary to a substantial extend since some such trunks are not usually intended for long interoffice tandem connections. It is, therefore, advantageous in some applications to determine the maximum number of such local exchange trunks which can be usefully employed in one tandem sequence and limit the interoffice handoff to a corresponding number. To that end, a serving MTSO in the system described herein advantageously maintains in its memory 27, for each call in progress, a group of data including the mobile unit identification number, a list of the MTSO's included in the tandem connection and the handoff count prevailing at each, and the net number of interoffice handoffs that have been accomplished with respect to the call connection. That net number is advantageously incremented upon the addition of each additional MTSO to a tandem sequence and decremented for each MTSO that is dropped from a sequence. The net number is also tested with respect to the predetermined maximum number during the interoffice handoff process to be described.

Figure 3:
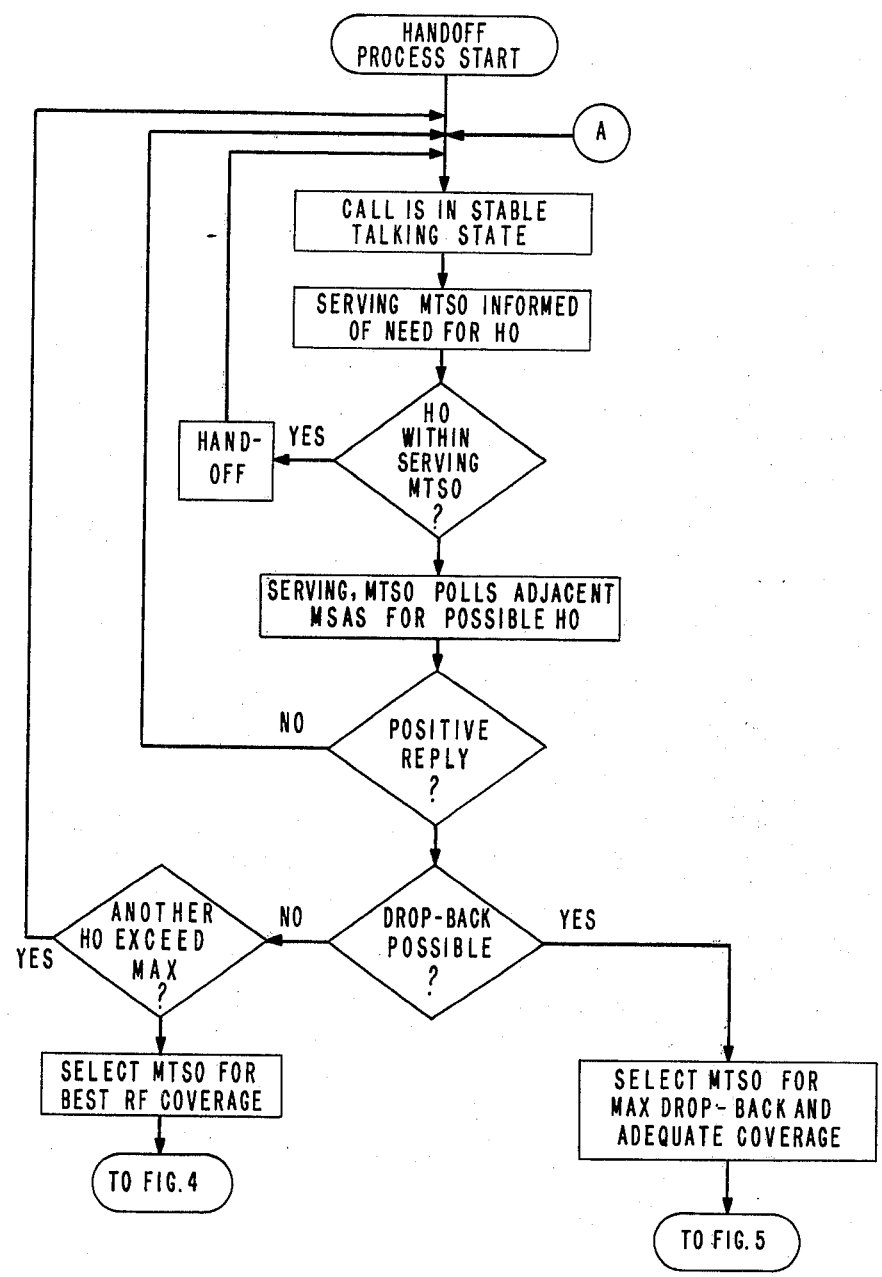
FIGS. 3-5 comprise a process flow diagram for the process of handing off a call of progress between MSA's and including a drop-back sequence in accordance with the present invention.
Figure 4:
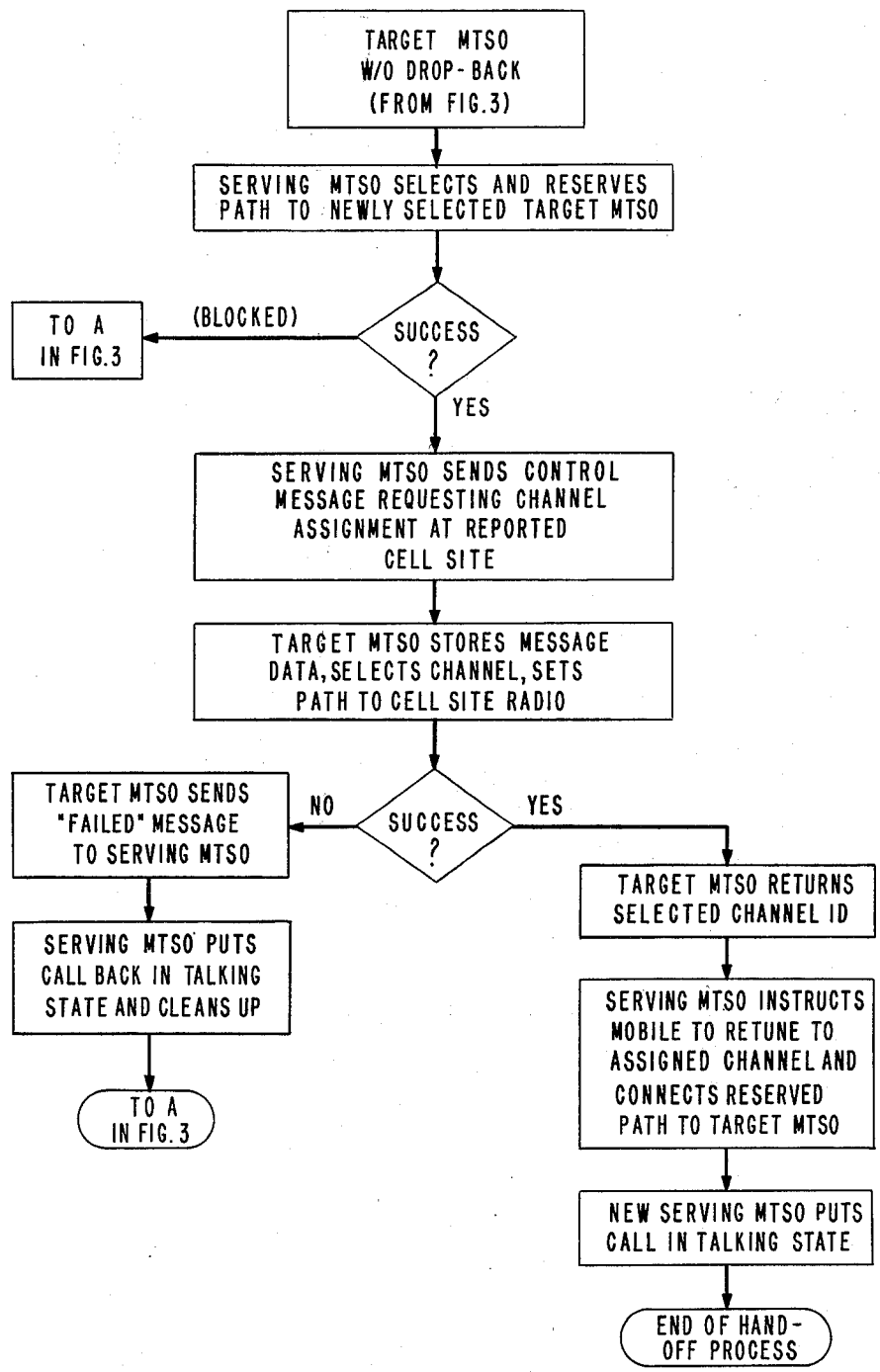
Figure 5:
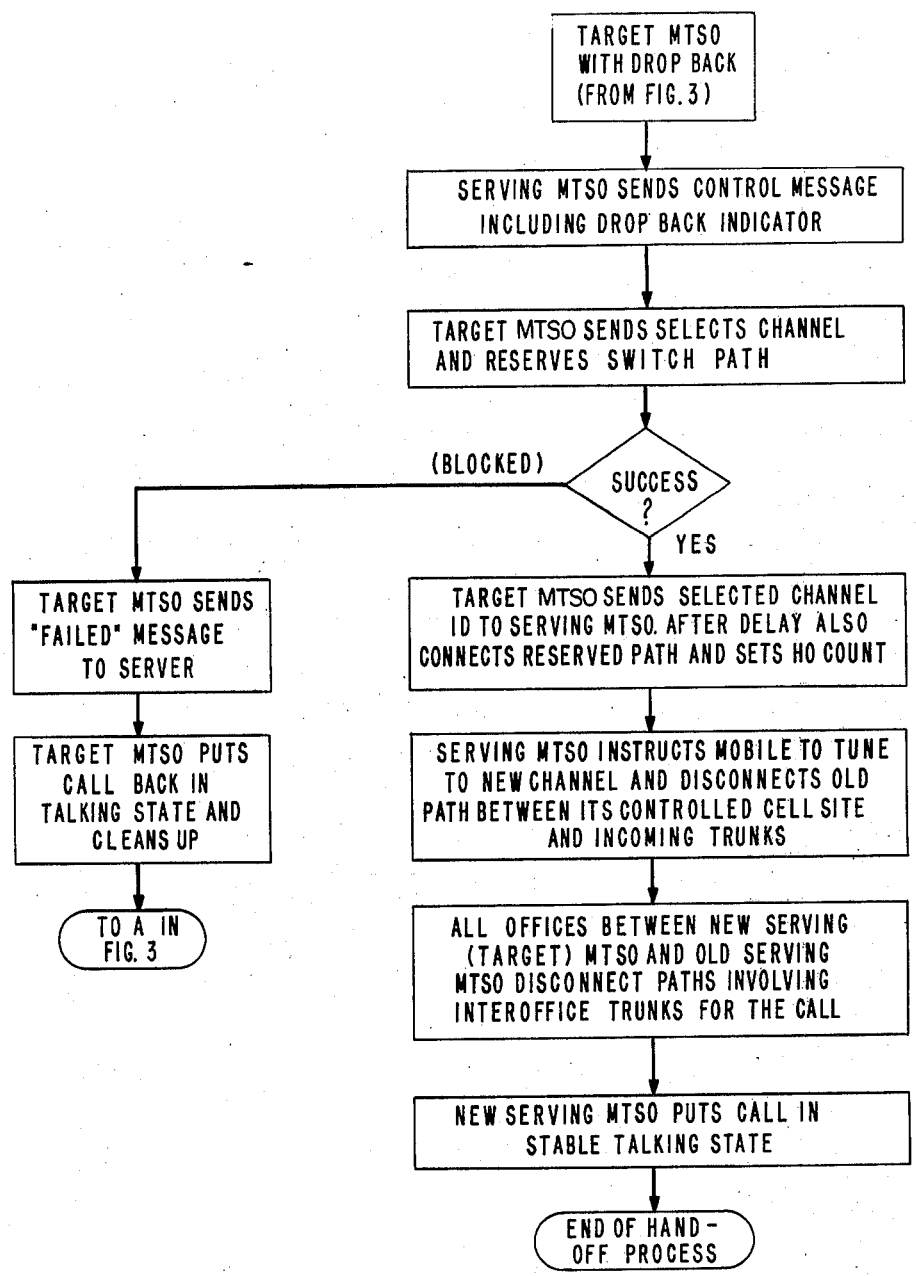

FIGS. 3-5 comprise three major parts of a handoff process for accomplishing interoffice handoffs in the system of FIG. 1. This process contemplates both the handoff situation in which an additional MTSO is added to a call connection and the situation in which one or more MTSO's are removed from a call connection in the course of a handoff to accomplish the drop-back function considered herein. The process is cast in general terms relating to a serving MTSO and a handoff target MTSO. A target MTSO is an office that has been determined to control a cell site that serves a cell which has been found, on the basis of signal reception quality criteria, to be one into which a mobile unit engaged in a call in progress is about to move. A serving MTSO for the call connection is the office which controls the cell antenna site of the cell, or sector thereof, in which the mobile unit has been most recently travelling. Particular illustrative examples of various modifications in interoffice connections for handoff purposes will also be further described in connection with FIGS. 6-12. The description of FIGS. 3-5 assumes that the MTSO's serve different geographical regions, although similar processes would be involved where at least two of the MTSO's cover some common geographical region utilizing different frequency channel blocks.

In FIGS. 3-5, the situation presumes a call already in progress and including the mobile unit 11 in the FIG. 1 system. It is immaterial whether the mobile unit is being operated by the calling or the called party. The second party to the call in progress is typically either another mobile unit user in the same or a different MSA, or a subscriber operating a fixed station which is connected through a class 5 telephone office to the serving MTSO either with or without one or more intervening tandem MTSO's.

In FIG. 3, at the start of the process, the call is in the stable talking state, and that fact is recorded in the "call state" portion of a Call Register in memory 27. The need for a handoff of the call connection to a cell site and channel different from that currently serving the call is detected at the serving cell site, and a corresponding data message communicated to the serving MTSO. This need is a function of mobile unit location and can be detected by testing various indicia known in the art such as signal delay ranging data, angle of arrival data, or received signal strength data. The particular locating technique actually employed is immaterial for purposes of the present invention, and so the process of FIGS. 3-5 is herein described in terms of simply a received signal quality figure.

The serving MTSO reacts to the data message by changing the Call Register, call state indication for this call to the handoff state; but there is no interruption in the call. That serving MTSO also looks into its memory 27 for identification of the various cell antenna sites, and faces of the antennas there in a directional cell site, which must be interrogated for the current serving cell to find a handoff target. It finds, for the case in which a handoff between MTSO's is possible, that at least one of the listed cell antenna sites is in an adjacent MSA. In this situation, the MTSO handoff process first interrogates only cell sites of its own MSA. If a satisfactory handoff can be achieved within the subset of cell sites of the serving MTSO, that will be done; and the process loops back to the starting point A in FIG. 3. At that point, the CPU 26 carries out various other normal system processes (not shown) until a need for a handoff on some call connection is once more detected. If a satisfactory handoff cannot be arranged within the MSA of the serving MTSO, that MTSO sends data messages to the MTSO's of all "foreign" cell sites included on the list of possible handoff target cell sites. Each of these messages requests the addressed MTSO to interrogate its cell sites listed in the data message as to signal reception quality on a channel indicated in the data message, i.e., the channel of the call in progress which requires handoff from the cell site then serving that call.

If no positive reply is received, the process loops back to point A. A positive reply is one in which the potential handoff target MTSO indicates an adequate reception quality figure at one of its listed cell sites. At point A, the call in progress proceeds with the same serving cell site while substantially periodically, e.g., every five seconds, the system repeats the part of the process described so far until either a suitable handoff target cell site is found or supervision of the call is lost. Supervision may be lost, for example, by failure of the serving cell site to receive transponded superaudible tone on the call channel from the mobile unit. The call is automatically terminated upon loss of supervision.

However, assuming at least one positive reply from one of the polled MTSO's, the reply indicates the identification of the replying MTSO, the cell site and antenna identification (in a directional site) for the site experiencing adequate received signal quality, and a received signal quality figure for each such cell site antenna face which the replying MTSO had found to be satisfactory. The serving MTSO then checks to see whether or not a connection drop-back is possible, that is, whether or not one of the MTSO's giving a positive reply is already included in the MTSO list of the call connection so that a drop-back would be possible.

If a drop-back is not possible, the serving MTSO tests the handoff count for the call in progress to determine whether or not it is already at the maximum handoff count, i.e., whether or not another handoff would exceed the allowable maximum count. If it would exceed the maximum, the process loops back to point A because a handoff is not permitted at this time. If the maximum would not be exceeded, a handoff target MTSO is selected from among all of those returning positive poll replies. The selected MTSO is advantageously the one which can provide the best radio frequency coverage for the call, i.e., that reporting the best received signal quality figure. Next, the process advances to the branch depicted in FIG. 4 and which will be subsequently described.

Returning to the drop-back test in the FIG. 3 portion of the process, if drop-back is possible, the process selects as the handoff target MTSO the one for which the maximum drop-back is possible, i.e., the one having the lowest net handoff count associated with its identification in the MTSO list for the call and also having at least adequate radio frequency coverage in terms of received signal quality. Use of this selection should then maintain call signal quality within predetermined bounds, and it will also yield a call connection with the minimum number of interoffice circuits in the tandem voice connection. After making this selection, the process advances to the branch illustrated in FIG. 5 and which will be subsequently described.

In FIG. 4, there is shown the process branch for the connection of a target MTSO without a drop-back function. In this branch of the process (which relates also to the illustrations of FIGS. 6–8), the handoff target MTSO has been selected. Now, the serving MTSO selects and reserves, e.g., by marking it busy in memory, a new path for the call connection through its own switch 28 from the incoming trunk for the connection (from a class 5 office or a prior tandem MTSO) to a trunk to the selected target MTSO. If this path selection is blocked, the process returns to point A in FIG. 3; and the target MTSO, upon receiving no further communications after a predetermined time-out, erases the cell site interrogation information which it had accumulated for the serving MTSO. However, if the path selection is successful, the serving MTSO sends a control data message to the target MTSO identifying the mobile unit identification number, the interconnecting trunk selected and reserved, the current total handoff count, and the list of MTSO's (including the serving MTSO) already in the call connection and the handoff count at each. The message connection also requests frequency assignment in the cell site number (and antenna face number if a directional cell is involved) for which the target MTSO had previously reported a positive poll reply.

That target MTSO stores the data from the received message, selects a channel at the named cell site, sets up a path from the designated interconnecting trunk through its own switch to the selected cell site channel radio, and increments the received total handoff count. If the path selection and connection in the target MTSO switch should be blocked, that MTSO sends a failure message to the serving MTSO. The serving MTSO puts the call state indication back in the talking state and cleans up, i.e., releases the reserved switch path and trunk and puts the transmitted message data back into memory. The process then loops back to point A in FIG. 3. Assuming, however, that the path connecting is successful, the target MTSO sends the identification of the selected channel back to the serving MTSO. The serving MTSO instructs the mobile unit to retune to the newly assigned frequency, connects the previously reserved path between the interconnecting trunk and the incoming trunk already included in the call connection, and disconnects the circuit path to the old serving cell site.

The old serving MTSO is now a tandem MTSO in the call connection, and the target MTSO is now the new serving MTSO. That new serving MTSO puts the call into the stable talking state, and all MTSO's resume normal ongoing call processing.

Figure 9:
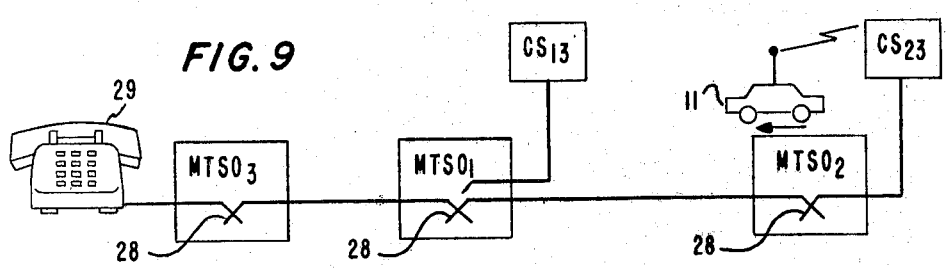
Figure 10:
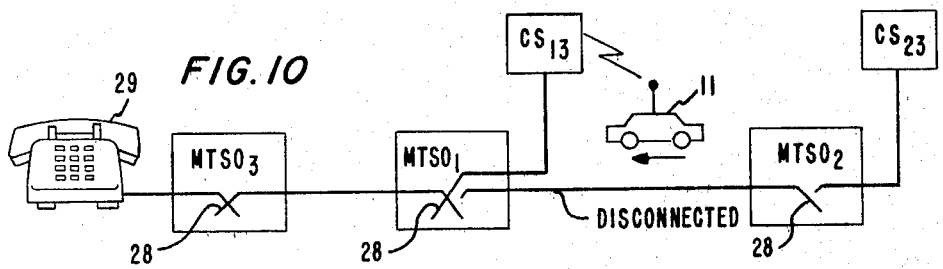
Figure 11:
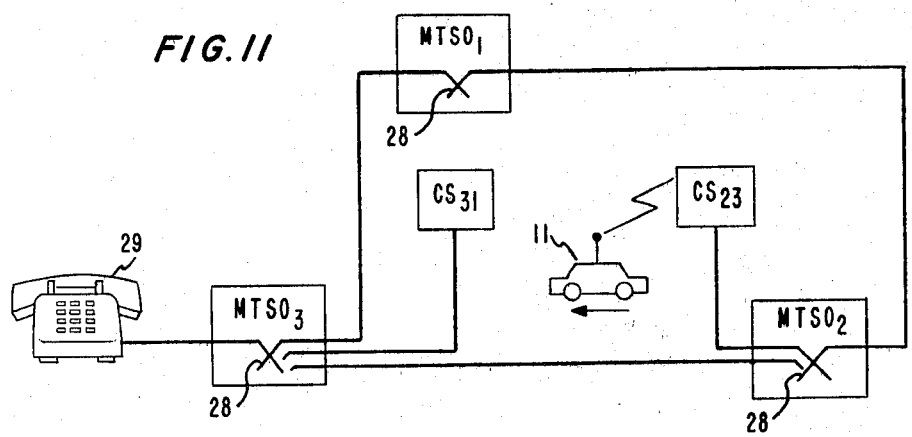
Figure 12:
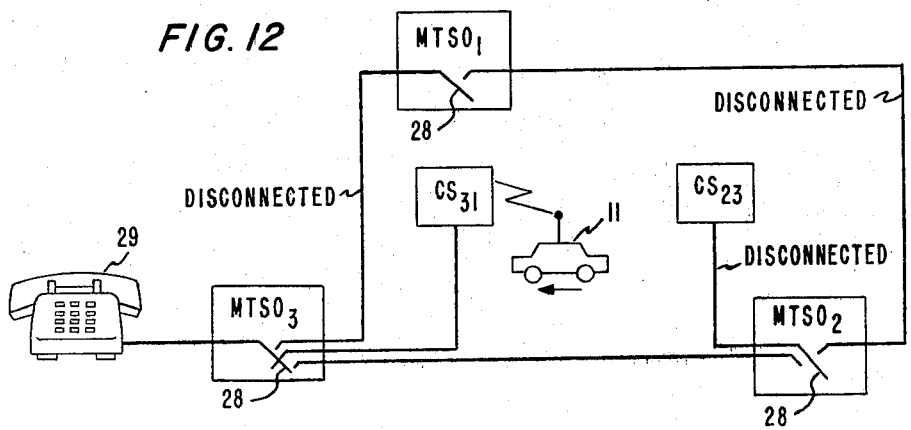

FIG. 5 depicts the branch of the handoff process for accomplishing handoff with drop-back by one or more MTSO's. FIGS. 9 and 10 illustrate the single-office drop-back, and FIGS. 11 and 12 illustrate a drop-back by plural offices. At the outset in FIG. 5, the handoff target MTSO has been selected. The serving MTSO computes a new handoff count to reflect the state that will exist after drop-back, e.g., it reads from the MTSO list the target MTSO prior count. The serving MTSO sends a control message to the target MTSO including the new handoff count, identifying the call (by mobile unit I.D. number), requesting a frequency assignment in the cell site number (and antenna face number for a directional cell site) for which the target MTSO had previously reported a positive poll reply, and labeling the handoff operation in progress as a drop-back case.

The target MTSO selects an available channel in the identified cell site and selects and reserves a path through its switch 28 from its incoming trunk for the call in progress to the channel radio of the selected frequency in the identified cell site. If the target MTSO path selection is blocked, a failure message is sent to the serving MTSO which puts the call back into the talking state; and the process loops back to point A in FIG. 3.

However, assuming a successful path selection, the target MTSO sends the new channel identification back to the serving MTSO. After a short delay to allow for reaction to that message transmission, the target MTSO connects the reserved path and sets the current handoff count equal to the value which had been sent by the serving MTSO. The serving MTSO instructs the mobile unit to retune to the new channel and disconnects the path through its switch 28 between its controlled cell site radio and its incoming trunk for the call. This action results in an on-hook voltage state being applied to that incoming trunk, i.e., the well-known trunk release sequence, thereby advising any prior tandem MTSO in the call connection also to disconnect the same trunk. This on-hook signal disconnection effect ripples back through the tandem MTSO's to the target MTSO. There the ripple stops because that MTSO will already have reconnected its incoming trunk to a new serving cell site; and the received on-hook signal is, therefore, disregarded. Alternatively, this office disconnection function for drop-back can be achieved by transmission of appropriate data messages, via respective data paths in the interoffice trunk paths, from the old serving MTSO to the respective tandem MTSO's which are to be disconnected.

Now, the old serving MTSO is out of the call connection, along with any other prior tandem MTSO's that had been between the target MTSO and the serving MTSO. The target MTSO is now the new serving MTSO, and it puts the call into a stable talking state. This is the end of the handoff process, and all MTSO's resume normal ongoing call processing.

Figure 6:
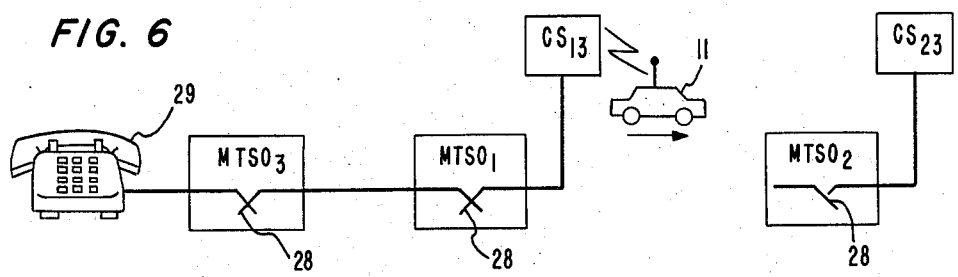
FIGS. 6-12 are simplified diagrams of several ways to utilize the method of extending and dropping back inter-MSA connections in accordance with the invention.
Figure 7:
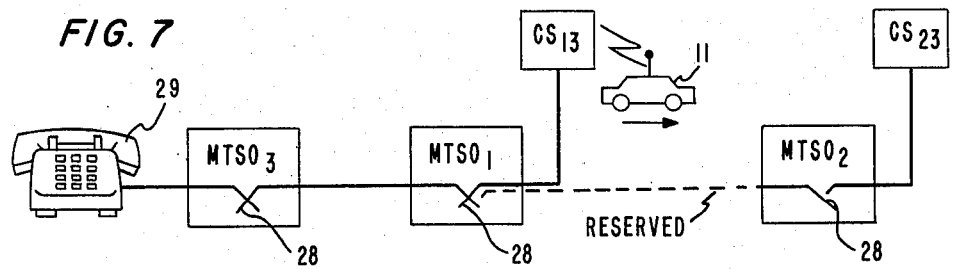
Figure 8:
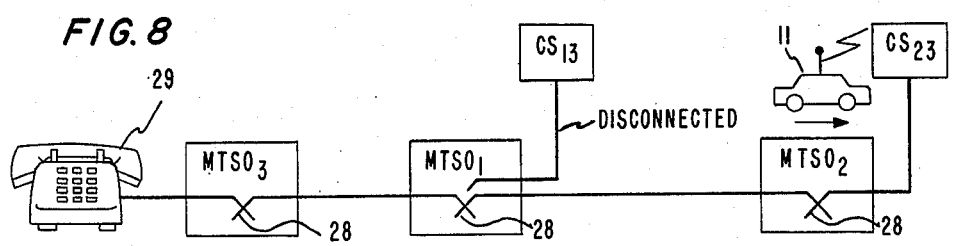

FIGS. 6–12 illustrate in simplified form changes in a call connection between a fixed subscriber station 29 and the mobile unit 11 in three typical illustrative situations. For convenience of illustration, the class 5 office providing a switched connection between a subscriber station 29 and the illustrated MTSO$_3$ is not shown. FIGS. 6–8 represent the extension of the call connection for a call in progress to an additional MTSO after two different MTSO's have already been included in the connection. FIGS. 9 and 10 depict a handoff situation in which a drop-back by one office is illustrated. FIGS. 11 and 12 illustrate the situation in which there is a drop-back by two offices. In each MTSO shown, at least one switch network crosspoint, either in the open circuit or the closed circuit condition, schematically represents the switch network 28 in the representation of that MTSO in the FIGS. 6–12.

In FIGS. 6–8, the mobile unit 11 is considered to have initiated a call while travelling in the MSA3 which is served by MTSO$_3$ therein. Thereafter, during the same call in progress, the mobile unit 11 travelled to the MSA1, and the call connection was extended through the MTSO$_1$ to the cell site CS$_{13}$ which is then serving the mobile unit 11. It is further assumed that that mobile unit is continuing to travel in a clockwise direction around the node 19 in FIG. 1 and is in the process of crossing the nominal border between MSA1 and MSA2 into the cell served by cell site CS$_{23}$. The need for a handoff is detected by the serving MTSO$_1$, and the MTSO$_2$ and its cell site CS$_{23}$ are determined to be the suitable target MTSO and cell site for the handoff in accordance with the process already described in connection with FIGS. 3–5. A trunk to MTSO$_2$ is reserved in the trunk path 16, and paths through the switch network 28 of each of the MTSO$_1$ and MTSO$_2$ are also reserved to establish a communication path through the MTSO$_2$ to the radio transceiver equipment of the selected channel in cell site CS$_{23}$ as illustrated in FIG. 7. When all paths have been thus reserved, the new ones are connected, and the old voice trunk between MTSO$_1$ and cell site CS$_{13}$ is disconnected as illustrated in FIG. 8.

It is useful to note at this point that one comparing FIGS. 8 and 1 herein could observe that the electric wire and radio circuit path between subscriber station 29 and mobile unit 11 in FIG. 8 is probably longer than the straight-line distance between MTSO$_3$ and the cell site CS$_{23}$. However, in the situation illustrated, beginning with FIG. 6, MTSO$_1$ is the serving office rather than MTSO$_3$ which is, at that point in time, merely a tandem office. Thus, MTSO$_1$ has autonomous control of the call connection. At that point in time, it is faster to extend the call connection from MTSO$_1$ to MTSO$_2$ than it is to evaluate relative path length information and transmit all of the data messages that would be required to re-establish an extended call connection from MTSO$_3$ directly to MTSO$_2$. Also, the path length information requires memory space not otherwise needed for the drop-back process. Considerations of processing time and connection rearrangement time are of considerable significance in the handoff situation since it is desirable to create only the minimum disturbance of the call in progress and to minimize the possibility of losing supervisory control of the call connection because the mobile unit has moved out of range of the serving cell site.

FIGS. 9 and 10 depict a drop-back by one office in a call connection such as that which has already been shown in FIG. 8 wherein MTSO$_2$ is the serving office. It is assumed that during the same call in progress, the mobile unit user remembers an urgent need to return, e.g., to a customer location in MSA1, and that the user makes a U-turn and proceeds back toward MSA1 along the same route which had been followed in the situation illustrated in FIGS. 6–8. Now, in FIG. 9, the mobile unit 11 is travelling in the opposite direction from that shown in FIG. 8; and, on coming into the vicinity of the nominal MSA boundary, the need for a new handoff is detected. Serving MTSO$_2$ determines that MTSO$_1$ and cell site CS$_{13}$ should be the new target MTSO and cell site and arranges, as described in regard to FIGS. 3 and 5, for the reservation of both an available channel transceiver in that cell site and a corresponding path for the call connection thereto through the MTSO$_1$. When all are reserved, the trunks between MTSO$_2$ and its cell site CS$_{23}$, on the one hand, and the MTSO$_1$ on the other hand, are disconnected; and, in MTSO$_1$, that same interoffice trunk is disconnected. The transceiver channel radio in cell site CS$_{13}$ is, in turn, connected into the call connection for subscriber station 29. The new situation is shown in FIG. 10.

It is noted that a similar drop-back situation can arise recurrently between any two MSA's serving adjacent urban areas that are separated by a hilly region in the area where a nominal border between MSA's could lie. When a mobile unit served by the first MSA, e.g., MTSO$_1$, passes over from the near side of the first hill to the far side of that hill, it is relatively shadowed from its serving cell site and may require a handoff to the second MSA and a cell site controlled by the MTSO$_2$. This handoff requires a first trunk between MTSO$_1$ and MTSO$_2$, and the latter MTSO then becomes the serving MTSO. As the mobile unit proceeds in the same direction, it climbs the near side of the second hill and may again need a handoff back to its original serving cell site controlled by MTSO$_1$ because the mobile unit is now shadowed from the cell site controlled by MTSO$_2$. However, in accordance with the process previously described, instead of adding another trunk from MTSO$_2$ back to the MTSO$_1$, the described drop-back process allows the MTSO$_2$ to cause the MTSO$_1$ to connect a trunk to its cell site channel radio, and both offices disconnect their respective ends of the trunk extending between them. This same cycle can be repeated as many times as there are hills in the nominal border area and, perhaps, may be required several times.

FIGS. 11 and 12 contemplate a different scenario for the FIG. 9 mobile unit user in MSA2 served by the MTSO$_2$. In this case, and during the same call in progress, the mobile unit user remembers an appointment in MSA3 and swings his vehicle in that direction. FIG. 11 depicts this situation, that is, with the mobile unit 11 headed toward MTSO$_3$, rather than toward MTSO$_1$. When mobile unit 11 is in the vicinity of the nominal boundary between cell site CS$_{23}$ and cell site CS$_{31}$, the need for a handoff is detected. MTSO$_3$ and cell site CS$_{31}$ are determined to be the new target office and cell site. Serving MTSO$_2$ also determines that the new target MTSO$_3$ was already in the call connection as a tandem office. Now, handoff proceeds as in FIG. 5, and the mobile unit 11 is directed to retune to the newly reserved channel. The corresponding trunk from cell site CS$_{31}$ is connected through MTSO$_3$ to subscriber 29. Serving MTSO$_2$ also initiates the disconnection of the interoffice trunk between MTSO$_2$ and MTSO$_1$, as well as the interoffice trunk between MTSO$_1$ and MTSO$_3$. Those operations also cause the voice trunk from MTSO$_2$ to cell site CS$_{23}$ to be disconnected from the call connection. Now, the drop-back rearrangement has been completed, and the call continues in the configuration illustrated in FIG. 12.

It should be apparent from the foregoing that the same considerations apply for MSA's operating on different frequency blocks but serving at least partially the same geographical area. In the case of a call connection between two mobile units in the same or different MSA's, their interoffice handoff needs are advantageously treated separately.

Although the invention has been described in connection with particular applications and embodiments thereof, it is to be understood that additional applications, embodiments, and modifications which will be obvious to those skilled in the art are included within the spirit and scope of the invention.

We claim:

1. A cellular mobile radiotelephone system including plural mobile telecommunication switching offices (MTSO$_1$–MTSO$_3$), each controlling a different set of cell antenna sites (CS) provided for radio communication with at least one radiotelephone unit (11) that is movable amoung cells of the system, trunk paths (16–18) connected between different pairs of said MTSOs, and an extended call connection including an MTSO for serving said mobile unit through a cell site and including at least a tandem MTSO coupled through said serving MTSO to such mobile unit, the system being characterized in that
each MTSO includes means (FIG. 5) for preventing an additional inclusion of one MTSO in said call connection in which that one MTSO is already included as a tandem MTSO.

2. The mobile radiotelephone system in accordance with claim 1 further characterized in that said preventing means includes
means (28) for connecting said one MTSO and one of its cell sites to serve said mobile unit in said call connection, and
means (23) for disconnecting from said call connection said serving MTSO and any other MTSOs theretofore in said call connection between said one MTSO and said serving MTSO.

3. A cellular mobile radiotelephone system including plural mobile telecommunication switching offices (MTSO$_1$–MTSO$_3$), each controlling a different set of cell antenna sites (CS) provided for radio communication with at least one mobile radiotelephone unit movable among cells of the system, trunk paths connected between different ones of said MTSO's, and means (23, 28) in each MTSO for interconnecting said paths to extend call connections, the system being characterized in that each MTSO serving a mobile unit engaged in a call connection includes
means (27) for storing for such call connection a list identifying all MTSO's still included in that connection that have been serving MTSO's for the same mobile unit in that same call connection, and
means (FIG. 5) for testing said list to detect whether or not a new handoff target MTSO for extending a call connection beyond a serving MTSO is already included in that connection.

4. The cellular mobile radiotelephone system in accordance with claim 3 which is characterized in that it further includes
means (25), responsive to the detection of a identification of said target MTSO in said MTSO list, for producing an on-hook signal indication on an incoming trunk path for such call connection.

5. The cellular mobile radiotelephone system in accordance with claim 3 further characterized in that it includes
means (23), responsive to the detection of an identification of said target MTSO in said MTSO list, for signalling said target MTSO and any additional MTSO's included in said call connection between said target MTSO and said serving MTSO to disconnect trunk circuits for said call connection.

6. In a cellular mobile radiotelephone system including plural mobile telecommunication switching offices (MTSO), each controlling a different set of cell antenna sites (CS) provided for radio communication with mobile radiotelephone units (11) movable among cells of the system, a method (FIG. 5) for extending a call connection involving a mobile unit from one of said MTSOs (e.g. MTSO$_2$ in FIG. 11) that is serving said mobile unit to a handoff target MTSO (e.g. MTSO$_3$) without dual inclusion of any MTSO, the method including the steps of
determining a suitable new handoff target MTSO (e.g. MTSO$_3$) for said call connection,
testing for the presence of said new handoff target MTSO among MTSOs already included in said call connection, and
if said new handoff target MTSO (e.g. MTSO$_3$) is already present in said call connection, disconnecting said serving MTSO (e.g. MTSO$_2$) and any other ones (e.g. MTSO$_1$) of said MTSOs theretofore in said call connection between a prior presence of said new handoff target MTSO (e.g. MTSO$_3$) and said serving MTSO (e.g. MTSO$_2$).

7. The call connection extending method in accordance with claim 6 and further including the step of
limiting extension of said call connection from an initial serving MTSO to a total number of MTSO's predetermined to be capable of providing at least a predetermined minimum signal transmission quality.

8. The call connection extending method in accordance with claim 7 in which said limiting step includes the steps of
maintaining a count of the number of different MTSO's in said call connection, and
terminating call-connection extension with respect to any new handoff target MTSO which would, if included, raise said count beyond said predetermined number.

9. A cellular mobile radiotelephone system including
plural means for serving mobile radiotelephone units in predetermined geographical service areas, respectively, said serving means being interconnectable by trunks, and each one of said serving means including
means for providing radio links for communications with selectable one of said mobile radio units, respectively,
means for switchably interconnecting one of said units in a call connection through one of said links of said one serving means, as an initial serving means, to either another of said units or a different communication station, and
means, responsive to movement of said one unit to a service area served by a different one of said serving means, for bypassing said one link and extending said call connection to said one unit through said interconnecting means of said initial serving means, at least one of said trunks, and at least said different serving means, and
means, in at least one of said initial and different serving means, and responsive to movement of said one unit again to an area served by said initial serving means, for initiating drop-back by both (a) disconnecting from said call connection said different serving means and any other of said serving means between said initial serving means and said different serving means in said call connection, and (b) connecting said unit in said call connection through a radio link of said initial serving means.

* * * * *

UNITED STATES PATENT AND TRADEMARK OFFICE
CERTIFICATE OF CORRECTION

PATENT NO. : 4,398,063

DATED : August 9, 1983

INVENTOR(S) : Ronald J. Hass and Charles F. Hunnicutt

It is certified that error appears in the above—identified patent and that said Letters Patent is hereby corrected as shown below:

On the cover page, left-hand column, after list of inventors, the following should be inserted:

[73] Assignee: Bell Telephone Laboratories, Incorporated, Murray Hill, N.J.

On the cover page, right-hand column, after Primary Examiner, the following should be inserted:

Attorney--Charles S. Phelan

Column 1, line 40, "invtervention" should read -- intervention --: line 58, "tht" should read -- that --, Column 2, line 10, "but is" should read --but it--. Column 4, line 64, "extend" should read --extent--. Column 6, line 11, "the" should read --that--. Column 7, line 25, "communications" should read --communication-- Column 12, line 44, "one" should read --ones--.

Signed and Sealed this

Third Day of July 1984

|SEAL|

Attest:

GERALD J. MOSSINGHOFF

Attesting Officer     Commissioner of Patents and Trademarks